US012052952B2

(12) United States Patent
Ketonen (10) Patent No.: US 12,052,952 B2
(45) Date of Patent: Aug. 6, 2024

(54) FULLY ROTATING ROTARY DEVICE (71) Applicant: Lauri Ketonen, Kristiinankaupunki (FI)

(72) Inventor: Lauri Ketonen, Kristiinankaupunki (FI)

(*) Notice: Subject to any disclaimer, the term of this patent is extended or adjusted under 35 U.S.C. 154(b) by 932 days.

(21) Appl. No.: 16/981,338

(22) PCT Filed: Apr. 4, 2019

(86) PCT No.: PCT/FI2019/050272
§ 371 (c)(1),
(2) Date: Sep. 16, 2020

(87) PCT Pub. No.: WO2019/193255
PCT Pub. Date: Oct. 10, 2019

(65) Prior Publication Data
US 2021/0007296 A1 Jan. 14, 2021

(30) Foreign Application Priority Data

Apr. 4, 2018 (FI) .................................. 20185315

(51) Int. Cl.
*A01G 23/08* (2006.01)
*B66C 3/00* (2006.01)
(Continued)

(52) U.S. Cl.
CPC .............. *A01G 23/08* (2013.01); *B66C 3/005* (2013.01); *E02F 3/3681* (2013.01); *E02F 3/413* (2013.01); *F16C 11/00* (2013.01); *F16C 2350/26* (2013.01)

(58) Field of Classification Search
CPC ........ A01G 23/08; B66C 3/005; B66C 13/12; B66C 13/14; E02F 3/3681; E02F 3/413; F16C 11/00; F16C 2350/26
See application file for complete search history.

(56) References Cited

U.S. PATENT DOCUMENTS 5,908,060 A  6/1999  Fargeot
7,735,530 B1  6/2010  Riha et al.
(Continued)

FOREIGN PATENT DOCUMENTS

EP    2123831 A2 * 11/2009 ............ E02D 3/074
FI    75471         3/1988
(Continued)

OTHER PUBLICATIONS

Office Action in corresponding Japanese application No. 2020-551566 dated Jan. 10, 2023 and English Translation.
(Continued)

*Primary Examiner* — Saul Rodriguez
*Assistant Examiner* — Brendan P Tighe
(74) *Attorney, Agent, or Firm* — Ziegler IP Law Group LLC.

(57) ABSTRACT

Fully rotating rotary actuator of a multi-purpose machine in which an axle supports the frame of a felling head by a bearing mount, there being a rotary mechanism driven by a rotary motor between the axle and the frame, and in which the connection of the axle includes rotatable joints, the axle includes conduits for electrical cables and a processing fluid line, and in which an additive fluid line tube is arranged in the conduit in the axle and connected to its lower end is a rotatable connector, which is connected to a second tube fastened in the frame for the application of the additive fluid.

11 Claims, 6 Drawing Sheets (51) Int. Cl.
*E02F 3/36* (2006.01)
*E02F 3/413* (2006.01)
*F16C 11/00* (2006.01)

(56) References Cited

U.S. PATENT DOCUMENTS

| | | | |
|---|---|---|---|
| 2004/0168568 A1* | 9/2004 | Roy | E02F 9/2271 |
| | | | 92/120 |
| 2005/0017528 A1* | 1/2005 | Ekman | B66C 3/005 |
| | | | 294/86.41 |
| 2006/0117946 A1 | 6/2006 | Dubreuil | |
| 2015/0016934 A1* | 1/2015 | Cooper | E02F 3/3677 |
| | | | 414/735 |
| 2015/0323377 A1* | 11/2015 | Öberg | B66C 3/005 |
| | | | 177/25.13 |

FOREIGN PATENT DOCUMENTS

| | | |
|---|---|---|
| JP | H03-114939 | 11/1991 |
| JP | H05-32379 | 4/1993 |
| JP | 2004-293722 | 10/2004 |
| WO | 99/37136 | 7/1999 |
| WO | 2017/203107 | 11/2017 |
| WO | 2017/217917 | 12/2017 |

OTHER PUBLICATIONS

English language abstract of 2004-293722.
Finnish Research Report in Finnish Application No. 20185315 dated Oct. 12, 2018.
International Search Report in PCT/FI2019/050272 dated Jul. 8, 2019.
English language abstract of FI 75471.
MT Series through bore Slip Rings, Moflon tuoteluettelo, [online], Sep. 2, 2014, Oct. 5, 2018].
Hydraulic solutions for challenging environments, [online], May 14, 2014, Oct. 3, 2018].

* cited by examiner

FULLY ROTATING ROTARY DEVICE

CROSS-REFERENCE TO RELATED APPLICATIONS

This application claims benefit of priority from International Patent Application No. PCT/FI2019/050272 filed Apr. 4, 2019, which claims benefit of priority from Finland Patent Application No. 20185315 filed Apr. 4, 2018, both of which are incorporated by reference in their entirety.

FIELD OF THE INVENTION

The object of the invention is a fully rotating rotary actuator of a harvesting or felling head, which includes
an axle to be suspended from a boom
a frame supported by means of bearings on the axle,
a first driven gear arranged coaxially with the axle,
a second driver gear and a motor installed in the frame that rotates the driver gear in order to drive the so-called first gear and in order to rotate the frame with respect to the axle,
rotatable hydraulic oil distribution means between the axle and the frame, said distribution means being connected to first couplings on the side of the axle and second couplings on the side of the frame.

Here, fully rotating means a construction with unrestricted rotation.

BACKGROUND OF THE INVENTION

Between the arm of the tree harvesting machine or multi-processing machine and the actual harvester head is a rotary actuator or rotator above the felling device. The felling or tilting device is a shank attached to the rotator, the shank being articulated at its bottom with the frame of the harvester head and designed to be driven by means of a hydraulic cylinder in order to pivot the harvester head into an upright position in order to fell the tree or into a horizontal position for delimbing and sectioning. The device allows the free suspension of the felling head. A felling device is a device, most frequently simply arms, with which the harvester head can be placed in the felling position by the force of a hydraulic cylinder. The top part is in turn attached via the rotary device or rotator to the arm of the base machine by means of a so-called universal joint. A rotary movement is thus produced between the harvester head and the arm by means of the rotary device. The orientation of the axle during the rotary movement is generally vertical with a deviation of approx. ±30° from the vertical position. The universal joint in the upper part of the rotary device facilitates the positioning of the harvester head in a suspended position. The speed of the rotary device is approx. 30r/m±50%. Hydraulic oil is needed in the harvester head for its actuation; moreover, electric power is needed for the actuation of the valves and for data transmission. The pressure of the hydraulic oil is 250 bar±30%, while its flow volume is ~200 l/min±30%. Naturally, a return oil line for the corresponding flow volume is also required, but the pressure here is only ~20 bar±30%. Sometimes a part of the return oil can be carried along its own line. This part is formed from the oil leaking from the motors and valves. Thus, 2 or 3 lines are required for the hydraulic fluids. All electric power and data transfers can be carried with one approx. 10 mm cable±30%. These days, all of these operations can be carried out via passageways of freely rotating rotary devices available on the market. In this case, one speaks of so-called fully rotating rotary devices. The most common way is currently, however, to run the hydraulics and electricity past the rotary device directly with tubing. In this case, the limited action of the harvester head is a problem. The operator constantly has to be careful not to rotate the harvester head too much so as to avoid damaging the tubing. In practice, depending on the pliability of the flexible tubing, the angle of rotation is merely approx. ±180°±30% around the vertically oriented axle.

In the entire world, approximately 4000 harvester head units (2018) are produced, said harvester heads coming in several different sizes. Only medium-sized harvester heads are made in large quantities (2000 units/year). The rotary device itself is a separate device. It is difficult to develop integrated rotary motors when the production quantities are small and there are also several sizes. When a separate motor is used with an external gear train, the same hydraulic motor can be used in large (2 units/machine) and small machines. The necessary moment of the rotary device can be achieved with a separate motor that creates a torque of 300 Nm. The 2000 Nm torque of a large machine can be easily achieved with two small motors and a gear ratio of 3.5, wherein the load of the gear is divided between the two gears. With a separate motor the same components can be used in all size classes.

While the final rotational speed in large machines is a maximum of 0.3 r/s, it is 0.6 r/s in small machines and the power demand is roughly the same in rotary devices of different sizes. Based on these theoretical values, the rate of rotation of the separate motor during rotation is 1 r/s, i.e. 60 r/min, while the power demand is 2 kW.

A problem with a freely, fully rotating rotary device is the large amount of space it requires. This is a drawback in particular in felling harvester heads. Generally, so-called ring bearings are used. This kind of bearing structure is both simple and compact. The bearing is able to take forces as well as moments directed upwards and downwards. Also required for rotation is a hydraulic motor that causes the rotation of either a chain ring or a ring gear. A rotation occurs in the latter in order to reduce the size of the hydraulic motor so as to achieve a gear ratio of at least 3 or even 6. Moreover, the actual passageway section in the device is not subjected to moments or other forces, but rather only to the stresses particular to the passageway. In new applications, however, a passageway is also needed in summertime for the processing of stumps. A substance tank and pump are located on the base machine. When the substance is e.g. urea, the dangerous nature of this additive for the hydraulics must be taken into account. The passageway must be created in such a way that it ensures that the oil and urea are kept separate during operation and maintenance.

A felling end rotary actuator predominantly in accordance with the introductory part of this application is known from Finnish patent FI75471(Neva-Kone Oy). There, the axle suspended from the universal joint is mounted in bearings in the frame section, which is in the upper end of the arm. The frame section includes a gear train that drives the gear of the axle.

Passageways required for hydraulic drive and rotatable distribution devices are known. The publication WO2014/133399 A1 (Waratah) describes a solution for distributors of hydraulic drive and also includes a rotatable electrical connection that runs through the axle. A corresponding solution can also be found in the publication U.S. Pat. No. 7,735,530 (Puma, LLC).

SUMMARY OF THE INVENTION

The object of the invention is to provide a new design for a rotary device, by means of which it is possible to convey processing fluid, in particular corrosive fluid, from the tank of the base machine to the felling head or for a corresponding application.

In the freely rotating rotary device according to the invention, a passageway for urea or corresponding substance has been accommodated, while its overall structure is cheaper and smaller. The axle fits advantageously into the smaller structure and in particular into the smaller diameter by mounting the same in bearings in a new way. Simultaneously, simple bearing mounts and the possibility of connecting a larger gear (chain or toothed) of the rotary device to a small-flanged axle render the manufacture of a small blank axle possible. The driven large gear (or large chain gear) is in the axle of the rotary device and the driving small gear (chain gear) is in the frame of the rotary device. In itself it is surprising that a non-coaxial rotational solution, bearing mount and additive fluid feed are combined. Especially if an electrical energy passageway through the axle is also implemented.

While the electricity distributor is co-axial and also has a hole running through it, the line most difficult to move, i.e. the processing fluid line for urea, etc. is at the co-axial centre, the feeding of urea occurring with a tube, advantageously with a hose, at the end of which is a rotatable connector. In principle, the auxiliary fluid feed line can be used for other applications as well. In one variant, high-pressure hydraulic oil is conducted with a central tube or merely by means of a conduit through the axle and subsequently with a hose or tube through the electricity distributor.

The fully rotating connector for the additional fluid line is ideally beneath the electricity distributor, the tube of the additive fluid conduit being guided to said connector through the electricity distributor. In case the connector for the fluid is above the electrical distributor or inside the axle, the tube to be removed from the connector would be guided through the electricity distributor. Although this design would be possible, it is difficult to realize in practice. Potential leakage would be very problematic for the electricity distributor.

The invention is described in the following by means of examples and with reference to the attached figures, which illustrate a rotary device in a multi-purpose machine according to the invention.

BRIEF DESCRIPTION OF THE DRAWINGS

FIG. 5b shows a section of the rotary device perpendicular to the plane shown in FIG. 5a.

DETAILED DESCRIPTION OF THE INVENTION

Figure 1:
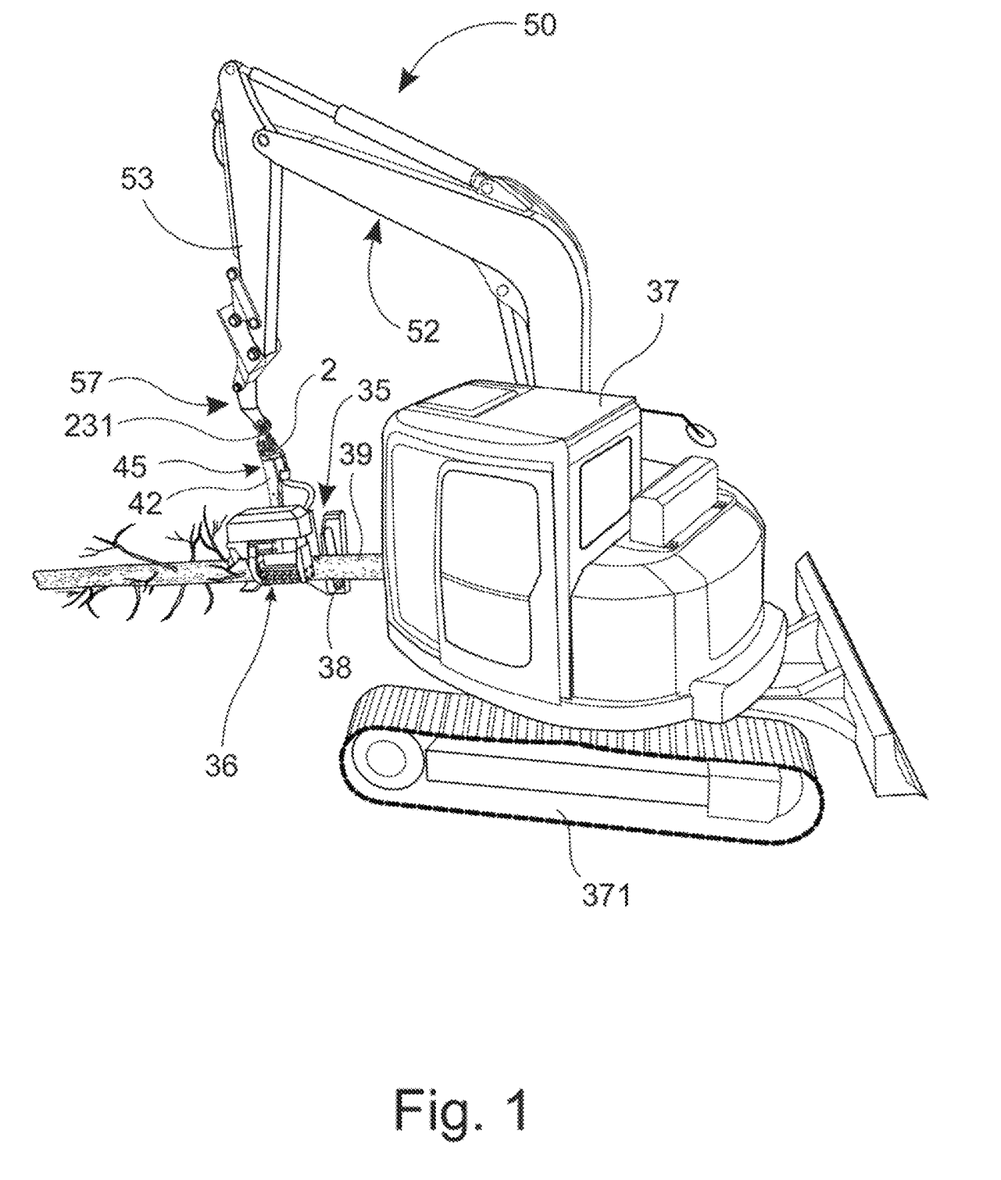
FIG. 1 shows a multi-purpose machine together with a small excavator.

FIG. 1 shows an example of a multi-purpose machine at a schematic level obliquely from the side. The tree-processing device of the multi-purpose machine, here harvester machine 35, is generally suspended from the base machine 37, here from the excavator's working arms 50. The latter comprises arms 52 and 53, wherein the end of the last arm, i.e. the end of the arm 53 here, has an adapter 57, from the joint of which a tree-processing device 35 is suspended (universal joint with its part 231). The articulation of the tree-processing device 35 with the arm 53 can be realized, e.g., according to the state of the art with two crossed swivel joints oriented in different directions with respect to one another, most frequently with an articulated coupling.

Between the tree-processing device 35 and the articulated coupling 231 is a rotary actuator (rotator) according to the invention integrated into an arm 42 of the felling device (tilter). By means of the rotation device, the tree-processing device 35 can be freely rotated around the axis of rotation of the rotation device. The hydraulic medium flow required by the operational devices (e.g. saw motor 38) of the tree-processing device 35 as well as electricity and processing fluid (generally UREA) can be conducted from the base machine 37 via the working arms 50 by means of tubes, most frequently by means of hydraulic medium lines and cables.

The rotary actuator can be designed to be attached with separate components, e.g. with bolts, to the upper end of the arm.

The base machine 37 is equipped, e.g., with wheels or with caterpillar tracks 371 as shown in FIG. 1. It can be said that the tree-processing device includes an operational unit, for example a felling head, the basic parts of which are a felling device 45, a cutting device 38, a feeding device 36 and delimbing blades which act as grapplers. The base machine 37 can be wheel-based or equipped with caterpillar tracks 371, as is the case here.

Figure 2:
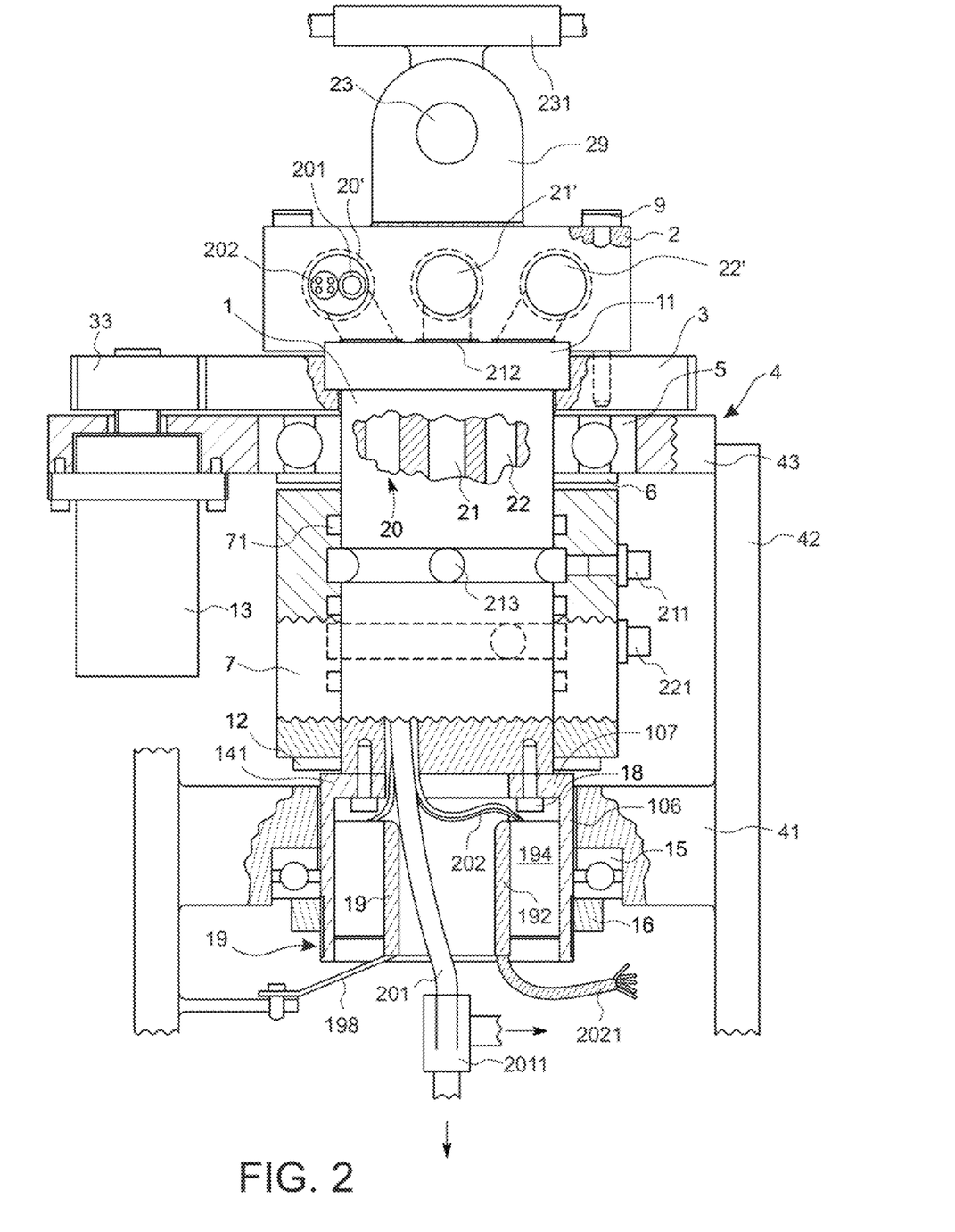
FIG. 2 shows a rotary device in accordance with the invention.

According to a first embodiment shown in FIG. 2, the top part of the felling device 45 includes a rotary device, the bottom part of which or frame 4 is integrated into the top part of the arms 42. The top end 43 of the frame 4 is attached via radial bearings 5 and the support elements 41 are supported by thrust bearings 15. The top end 43 and the support elements 41 are fastened securely to the arm 42. That is to say that parts 43 and 41 are attached between the arms 42. An axle 1 is attached to a hanger 2 by means of bolts 9 (as many as 30 units) and a gear 3. The bolts 9 tighten the gear 3 and the axle 1 together by means of a flange 11. A small shoulder structure in the flange 11 is sufficient here. FIG. 2 shows apertures 21' and 22' for the connectors. Oil flows via the aperture 21' and further through the connector 212 at the lower surface of element 2 via the conduit 21 formed in the axle 1 and from there further through the rotatable distributor 7 to the connector 211.

The conduit 21 first runs axially in the axle and then exits transversely at point 213. In between is the distributor 7, which comprises passageways and seals 71 for the hydraulic oil, the passageways and seals 71 being made in a known manner. Element 7 interlocks loosely with the arm 42 and with the upper end 43. In order to avoid that the element 7 rotate together with the axle 1, the tubing in the connectors 211 and 221 is often sufficient for interlocking. The tubes run between the bottom part 4 of the felling head of the harvester head and the control valves of the actual harvester head. By means of the teeth on the outer ring of the gear 3, the hydraulic motor 13 rotates, by means of the gear 33, the entire upper part of the rotary device, which includes, inter alia, elements 1, 3, 2, 202, 231, 14, 16 201, as well as the ring element 151 beneath the bearing 15 and the outer element 194 of the electricity distributor 19. Element 231 is the upper joint of the universal joint on the side of the boom, the upper joint being connected in an articulated fashion to the hanger 2 in the brackets 29 by means of a pin 23. Other typical joints can also be used here which transmit the moment while allowing a swinging in the horizontal plane.

The bearing 5 is between the axle 1 and the upper end 43. The outer dimensions of the bearing 5 are advantageously greater than those of the element 7. The bearing 5 is only subjected to lateral forces and can move slightly in the direction of the axle 1. Via the aperture in the bearing 5, the entire rotary device can be assembled or disassembled together with the distributor 7 and the element 14 initially underneath the upper part 43 between the supports 41, after which a thrust bearing 15 is mounted, to the underside of which a ring nut 16 is screwed. There thus exists a suitable clearance to the gear 3 when the felling device 45 is raised from the hanger 2.

In a state of assembly, the axle 1 is attached to the gear 3 and the hanger 2. Between the axle 1 and the hanger 2 is a seal (at least 2 units) for the hydraulic conduits, e.g. 212. The bolts 9 can now be mounted and tightened for operation. Next, the bearing 5 as well as a glide ring 6 are mounted on the axle 1. The glide ring 6 prevents the element 7 from rubbing the bearing 5. Now the element 7 with its seals is fit onto the axle. There are at least 3 seals 71. By means of a known technique, a connection is now created from the conduit 21 to the connector 211 and analogously from the conduit 22 to the connector 221. Next, the glide ring 12 is mounted so that the element 7 is now between two glide rings (elements 6 and 12). The lower casing 14 is attached to the axle 1 in the direction of the axle 1 with bolts 18. There are several bolts 18. Element 141 is the shoulder structure in element 14 and the shoulder structure 141 keeps the element 7 in place with a small clearance with respect to the axle 1. The aperture 22' running from the element 2 to the connector 221 via the conduit 22 functions in the same way as the oil flow from the aperture 21' to the connector 211 via the conduit 21.

In an assembled state, the element 14 extends through the support element 41. The frame 4 is integrated between the arms 42. The support element 41 comprises a butt bearing 15 and an appropriate clearance can be set between the gear 3 and the frame 4 by means of the ring nut 16. During operation, the bearing 15 is subjected to the loads resulting from suspension of the harvester head. Advantageously, the bearings 5 and 15 are not subjected to loads acting in a different direction. Inside the element 14 is an electrical passageway element or rotatable electricity distributor 19 consisting of an inner part 192 and an outer part 194. The inner part 192 is anchored in the arm 42 with anchors 198 and the outer part rotates together with the casing 14 and thus with the axle 1.

Now, in the rotary device according to the invention, urea or an analogous additive is conducted via the aperture 20' in the element 2 to the conduit 20 (in the axle 1) along the inserted tube 201 through the casing 14 and the electricity distributor 19. It is also advantageous to conduct the electrical cable 202 in parallel with the urea tube 201. The consumption of applied urea per hour is only 30 l±30%. Based on its outer dimensions, a ~10 mm±10% flexible tube comprising a hole of approx. 5 mm±10% can thus be used. The pressure can be 50 bar. It is further advantageous to make the conduit 20 in the axle 1 slightly askew (5°±20%) with respect to the orientation of the axle 1. This way, it is easy to implement the passageways through the parts 14 and 19. It is also possible to make a separate conduit for the electrical cable, such as a conduit running from the aperture 20 via the conduit 20 in the axle 1 into the interior of the element 14. The diameter of the electrical cable is approx. 10 mm +30%. The element 19 is technically known. In this respect, currently 2 passageways are required for a current of approx. 15 A and 2 passageways are required for data transmission. The outer dimensions of such an electricity distributor 19 can be 85 mm±20% and inside the hole can be Ø~25 mm±20%. In FIG. 1, the electrical cable 202 running via the aperture 20 extends into the outer part of the element 19, said outer part rotating together with the axle 1. The inner part is rigid and the cable 2021 runs from here further to the control unit of the harvester head. The urea tube 201 comes out through the element 19 and the end of the tube 201 has a rotating connector 2011. The tube can be anchored, e.g., from the flange 141 of the element 14. However, the pressure in the connector 2011 only acts during felling/sawing so that the rotary device does not work normally. When the rotating connector inside the tube is not subjected to pressure, its moment of friction is very small and under 0.5 Nm±50%.

The tubes from the rotating connector 2011 can continue sideways or in the direction of the tube. During maintenance or repairs the tube 201 can be plugged at both ends. This way it is ensured that urea or an analogous substance does not intermix with the hydraulics. The tube 201 can be made of a rigid tube; however, in this case, its removal and installation first require the removal of the element 2. In this case, the outer diameter of the tube can be Ø8-10% and the conduit 20 is most preferably arranged dead centre.

The rotatable electrical connector, electricity distributor 19 is of a constant type, but must be co-axial, i.e. there is an opening running through its centre.

The processing fluid line hose, especially for urea, is advantageously a conventional hydraulic hose. The latter thus has a pressure durability, but at the same time an abundant twisting strength for the rotatable connector. The hydraulic hose to the connector can be led from the aperture 20' downward through the conduit 20 in order to be connected to the rotatable connector 2011. The continuous hose is advantageously also a hydraulic hose and is fastened after a distance in the frame of the felling device, e.g. in its arm.

The rotating connector for the processing fluid line is advantageously a rotatable hydraulic connector, e.g. TAIMI (USA) T2, ser. no. SZ90-F06M-F06F. The electricity distributor is, e.g., Rion TB 2586 P0410 S02 (RION ELECTRONIC CO., LIMITED, CN).

Figures 3A, 3B:
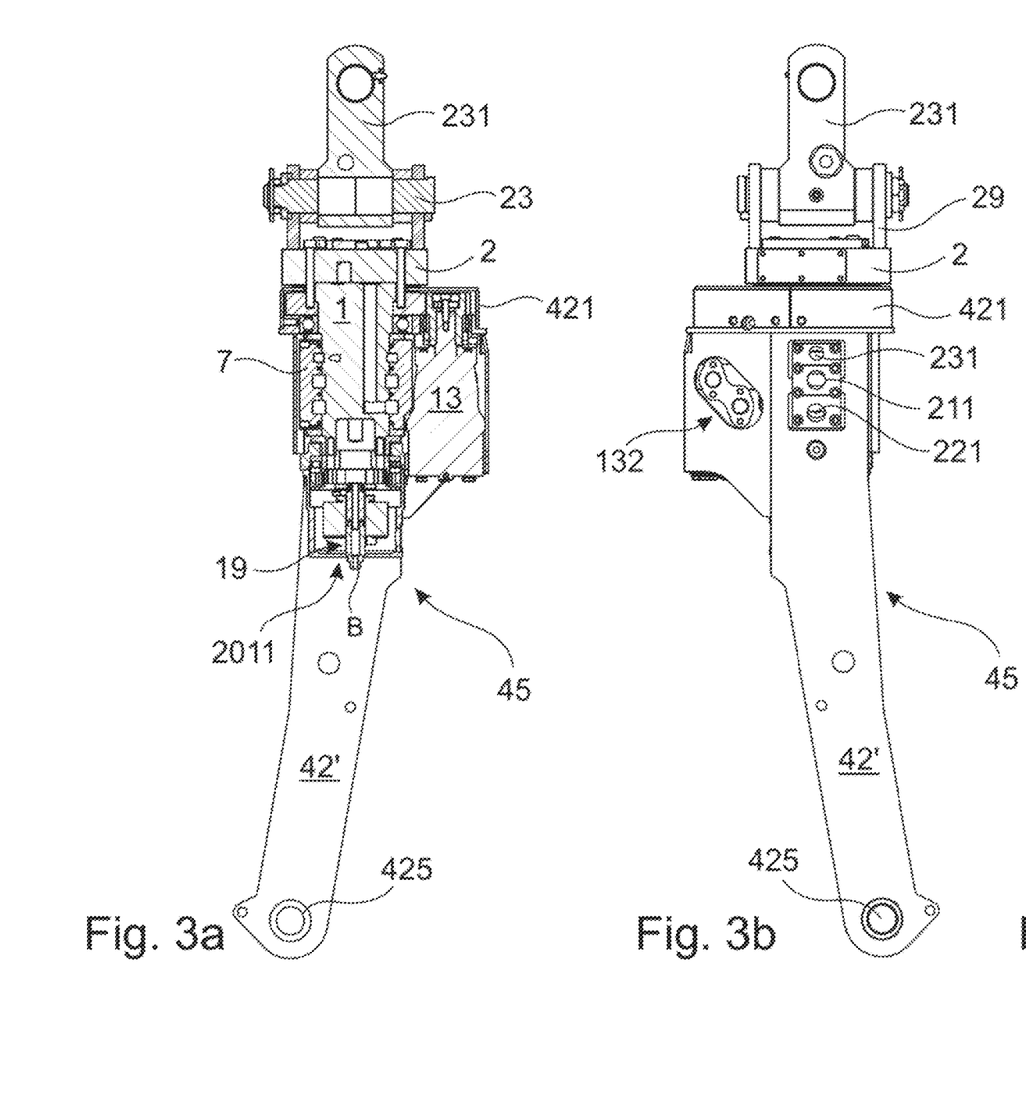
FIGS. 3a - 3c show an arm of the multi-purpose machine equipped with a further rotating device in accordance with the invention.
Figure 3C:
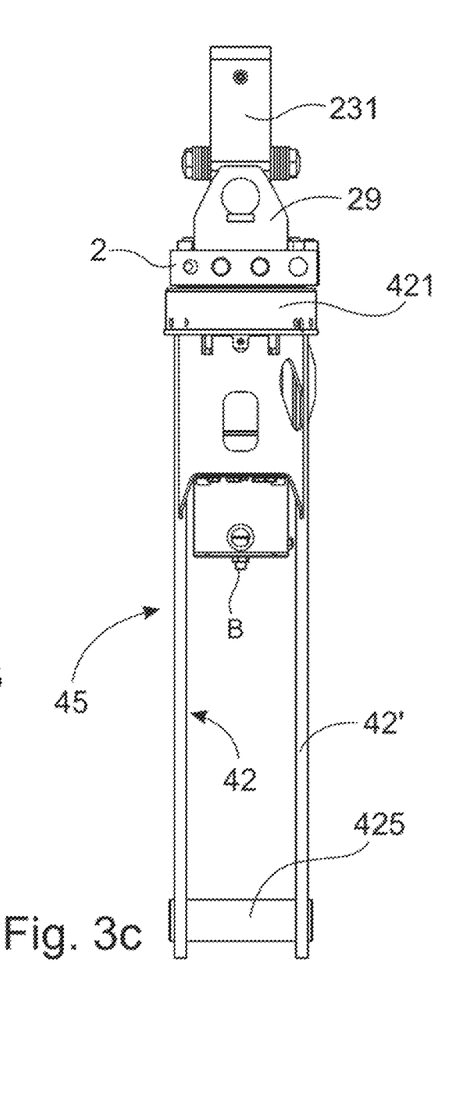

FIGS. 3a to 3c show a felling device 45 according to a further embodiment, which deviates only slightly from the preceding design. The arm 42 comprises two flat shafts 42' between which are the attachment members 43 and 41 disclosed in FIG. 2 and at the bottom of which is a rod 425 from which the actual frame of the felling head or harvester head is suspended. The rotary device and the rotatable distributors are integrated in the upper part of the arm, as in the embodiment shown in FIG. 2. The hydraulic oil distributor 7, the gears and the rotary motor 13 are encased, inter alia, by means of the casing 421. The feed interfaces 132 of the motor 13 and the hydraulic interfaces 211, 221, 231 are visible and available.

The felling device 45 is supported here from the hanger 2 as well, more precisely from the pin 23 of the bracket 29, which supports the upper part of the universal joint 231 in a conventional manner.

The arm 42 is also supported here by way of bearings from the axle 1, the upper part of which comprises the hanger 2. The central auxiliary fluid interface according to the invention exits from the rotatable connector 2010, more precisely from its lower part B.

Figure 4A:
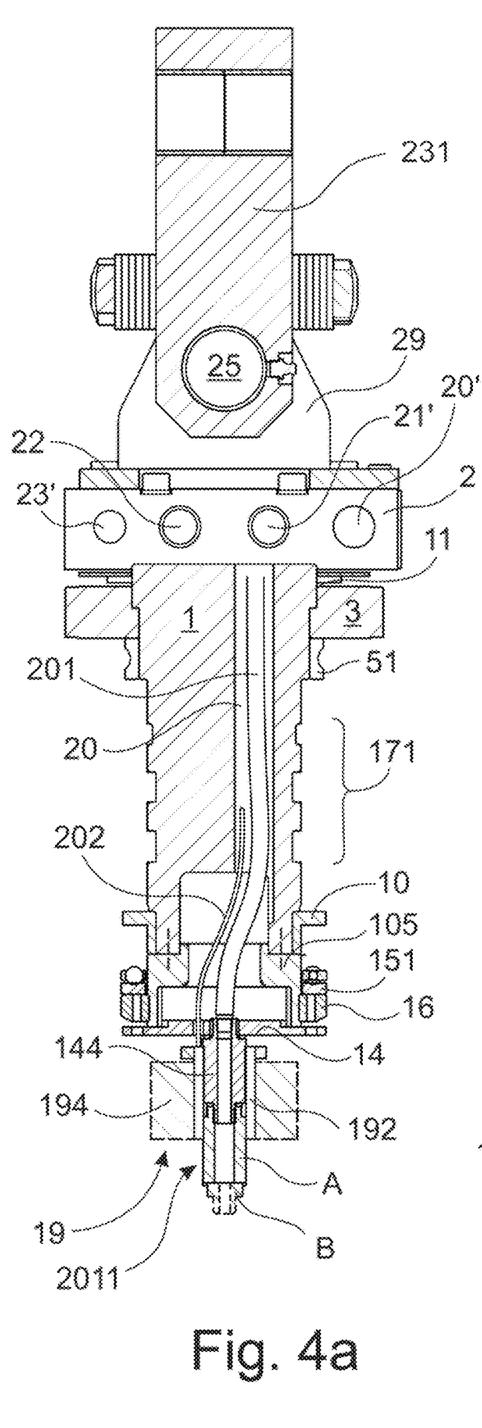
FIGS. 4a and 4b show the rotating parts of the rotating device shown in FIG. 3a and their interaction.
Figure 4B:
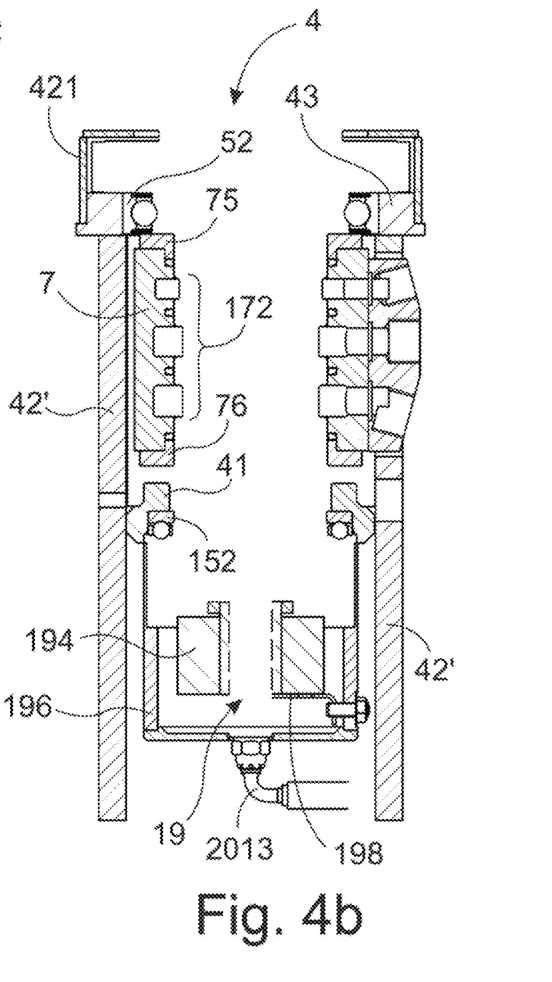

From FIGS. 4A and 4b the rotating parts are clearly visible with respect to one another. Rigidly attached in the upper part of the axle 1 is the hanger 2 (FIG. 4A), which has articulated means for its attachment to the boom. Here, the attachment of the gear 3 to the hanger 2 with the flange 11 remaining between the two is realized as shown in the embodiment in FIG. 2. Here, the hanger and axle have conduits 20, 21, 22, 23 while the hanger has corresponding apertures 20', 21', 22' and 23' for the leakage line. The hydraulic oil distributor 7 is of the same type as described above. Each conduit 21, 22, 23 is connected to its own groove on the surface of the axle 1, said grooves being commonly designated as the ring conduit system 171. The distributor 7 has corresponding ring conduits 172, which have couplings to the connectors 211, 221 and 231 in a manner known per se. Ring seals are disposed between the ring conduits in a known manner.

The bottom end of the axle 1 has a flange 10 made of the best material which interlocks with the extension 105 of the axle 1. The flange 10 and the gear 3 determine the axial position of the radial bearings 5 and the sleeve-like hydraulic oil distributor 7.

The version of the thrust bearing 15 shown in FIG. 4a, i.e. its lower ring 151, is supported by means of the ring nut 16 arranged in the extension 105. This works as in the embodiment shown in FIG. 2. The ring nut 16 supports the lower ring of the thrust bearing 15 and, by way of the balls, the upper ring 152. By means of the ring nut 16, the thrust bearing 15 is raised together with the support 41 (which is ring-shaped here) of the frame 4 to a height so that there remains a small clearance between the gear 3 and the top of the upper end 43 of the frame 4.

The most essential difference here from the embodiment shown in FIG. 2 is that the ring-shaped inner part 192 of the electrical distributor 19 is fastened in the axle 1, more precisely in its lower end 14, and the ring-shaped outer part 192 is in the arm 42, more precisely in the flat shafts 42' on the bar 198. Attached to the lower end 14 is a conduit extension section 144, to the upper end of which the tube 201 is connected. Connected to the lower end of the extension section 144 is a rotatable connector 2011, more precisely its upper end A, the lower end of the rotatable connector 2011 being joined by a moment connection to the lower end of the casing 196. The rotating lower part B exits the casing 196 and an extension tube 2013 is connected to it in order to deliver processing fluid to the nozzles. The moment generated by the tube for urea, etc. is also sufficient here in order to cause the lower part B to rotate vis-à-vis the upper part A.

The central line can also be utilized for oil delivery by means of its high pressures if a processing fluid line is not required. Such an alternative would be, e.g., a straight line leading to a hydraulic accumulator.

Figure 5A:
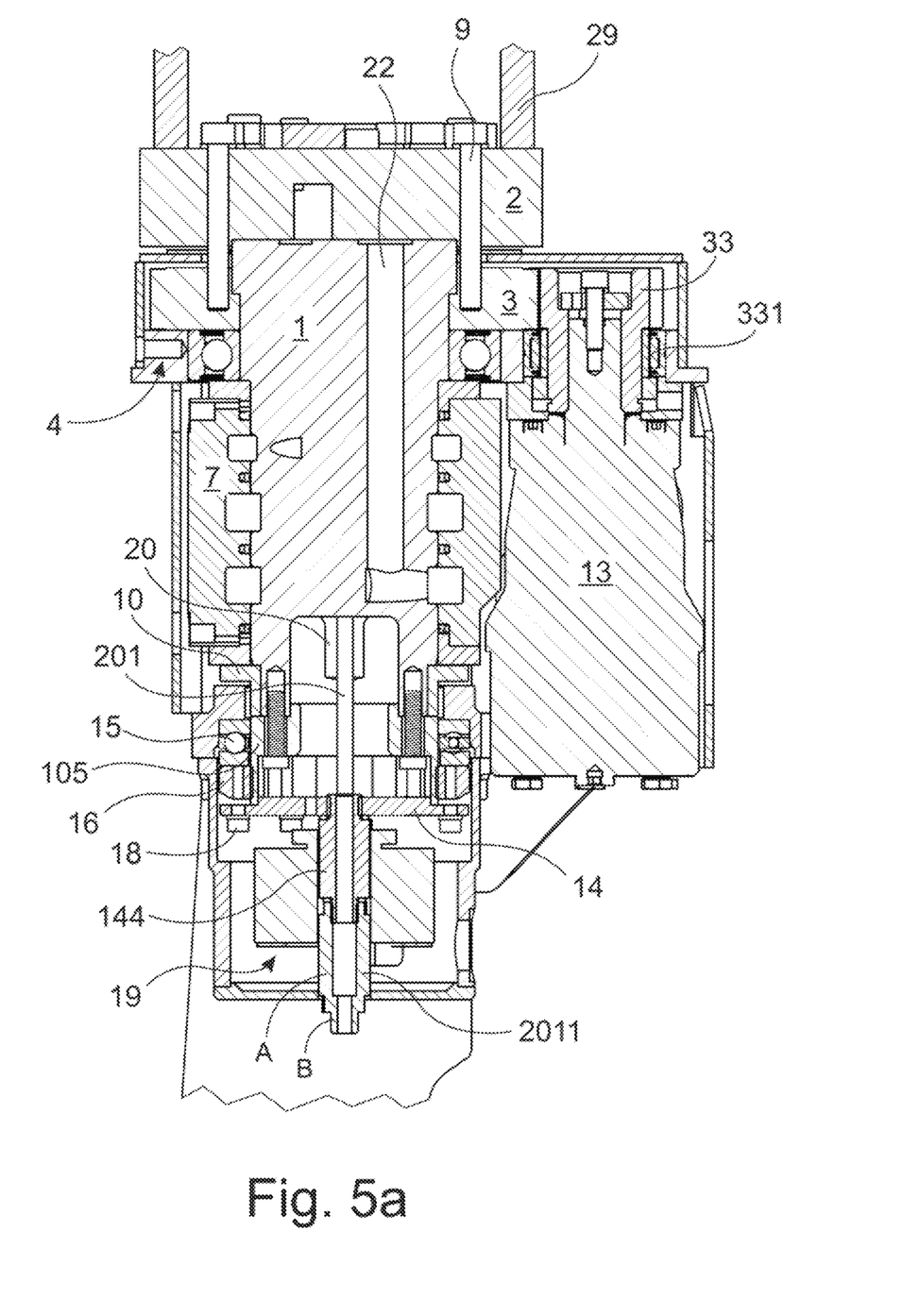
FIG. 5a shows a section of the rotary device in the plane of the motor.
Figure 5B:
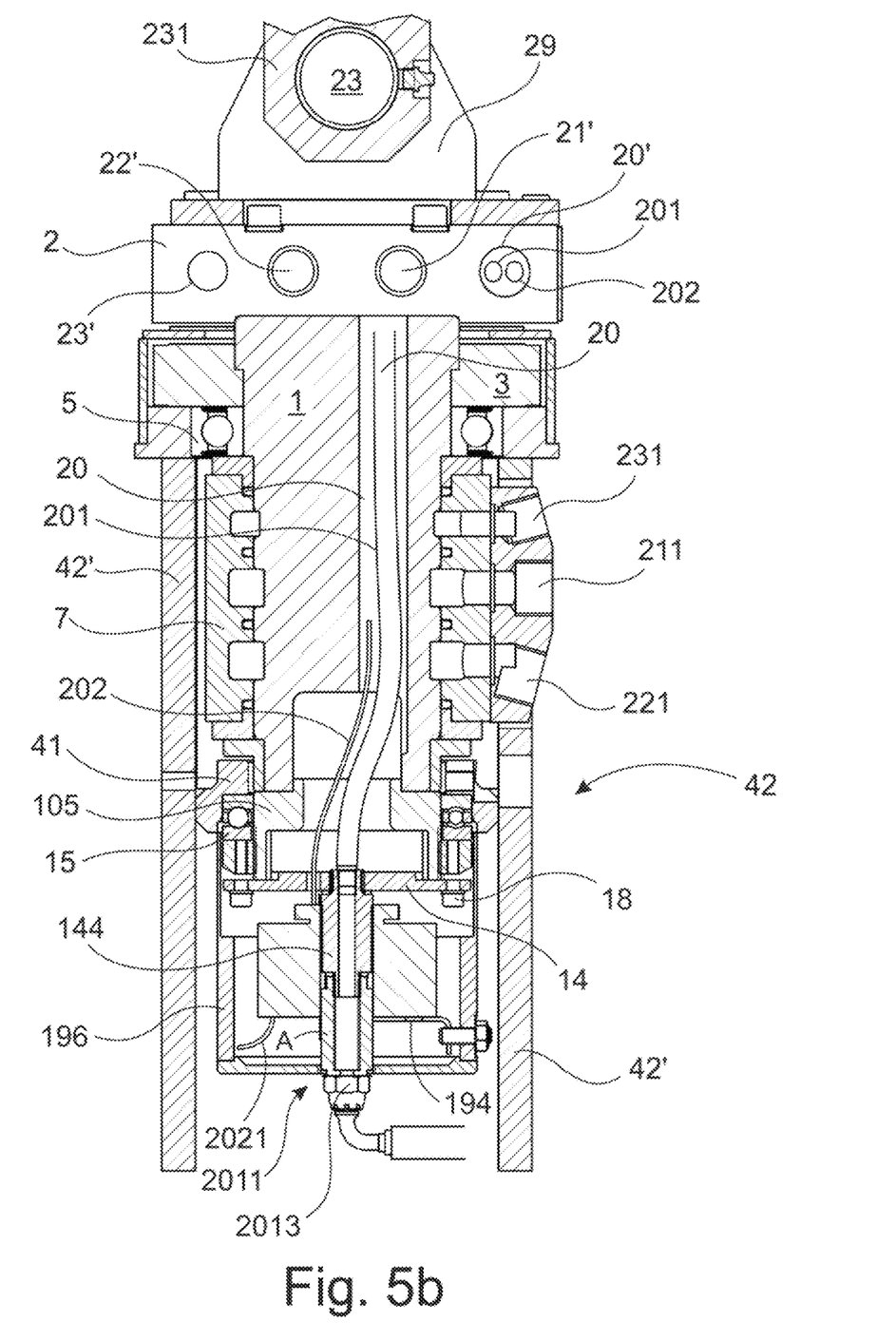

FIGS. 5a and 5b show two sections of a new embodiment, one through the motor and the other perpendicular thereto so that the different conduits 20, 21 are visible. In FIG. 5a a hydraulic oil conduit 22 inside the axle is visible. In FIG. 5b, the same conduit 20 as shown in FIG. 4a is visible. FIG. 5b shows the arrangement of the motor 13 in the frame 4 and a driver gear 33 connected to its axle. The latter is supported from the frame 4 with needle bearings 331.

LIST OF PARTS

| | |
|---|---|
| 1 main axle with its conduits | 13 motor |
| 10 support sleeve | 132 motor feed |
| 105 axle extension | 14 lower end |
| 106 extension (FIG. 2) | 144 intermediate tube |
| 11 flange | 145 lower casing (FIG. 5) |
| 2 hanger | 5 radial bearing |
| 20 additional conduit (aperture 20') | 51 inner ring of bearing |
| 201 additive fluid tube | 52 outer ring of bearing |
| 2011 rotating connector | 15 thrust bearing |
| A inner part, B outer part | 151 lower ring of bearing |
| 2013 hose connector | 152 upper ring of bearing |
| 202 electrical cable | 16 ring nut |
| 21 hydraulic oil conduit | 19 co-axial electrical connector |
| 21' aperture | 192 inner part |
| 22 hydraulic oil conduit | 194 rotating outer part |
| 22' aperture | 196 lower casing |
| 28 leakage line, aperture 28' | 198 moment support |
| 29 bracket | 30 harvester head |
| 23 hanger pin | 18 bolts |
| 231 upper joint | 35 felling head, e.g. harvester head |
| 3 gear | |
| 33 driver gear | 36 feeding device |
| 331 needle bearings | 38 cutting saw |
| 4 outer ring | 39 tree to be processed |
| 42 arm | 37 base machine |
| 42' side shaft of arm | 371 caterpillar track |
| 45 entire felling device | 50 boom/arms |
| 6, 12 glide rings | 52 lifting arm |
| 7 distributor (hydraulic oil) | 53 folding arm |
| 71 seals | 57 adapter |
| 171 inner ring conduits | |
| 172 outer ring conduits | |

The invention claimed is:

1. A fully rotating rotary actuator of a felling head, comprising:
   an axle having a bottom end to be suspended from a boom, the axle including a conduit for conducting an electrical cable through the axle in an axial direction,
   a frame supported co-axially by means of bearings from the axle,
   a first, driven gear arranged in the axle,
   a second, driver gear and a motor that rotates it installed in the frame for driving said first gear and for rotating the frame with respect to the axle,
   rotatable hydraulic oil distribution means between the axle and the frame and first couplings connected thereto on the side of the axle and second couplings on the side of the frame,
   at least one additional conduit in the axle for an additive fluid line or a tube for additive fluid arranged in the additional conduit, said additional conduit/tube having a lower end,
   a fully rotatable connector having a first part (A) and a second part (B),
   the lower end of the additional conduit/tube being connected to the first part (A) of the fully rotatable connector, and the second part (B) being connected to a second tube fitted in the frame for conducting the additive fluid for application,
   an electricity distributor at the bottom end of the axle between the axle and the frame and connected to a co-axially arranged electrical cable, the electricity distributor comprising parts that rotate with respect to one another, namely an outer ring and an inner ring, wherein one part is fastened to the axle and the other part to the frame while leaving a gap in the middle of the inner ring, and in which the tube is conducted out of the axle via the gap in the inner ring of said electricity distributor.

2. Fully rotating rotary actuator according to claim 1, wherein the tube is formed so as to be integrated in the axle's central conduit and the fully rotatable connector is directly in the lower end of this central conduit.

3. Fully rotating rotary actuator according to claim 1, wherein the rotating part (B) of the fully rotatable connector of the additive fluid line is arranged outside of the electricity distributor and a 90° tube connector is connected thereto.

4. Fully rotating rotary actuator according to claim 1, wherein the fully rotatable connector of the additive fluid line is a straight connector which has an inlet in its upper end and an outlet in its lower end.

5. Fully rotating rotary actuator according to claim 1, wherein the bearings include a radial bearing in an upper part of the axle and a thrust bearing in a bottom part of the axle.

6. Fully rotating rotary actuator according to claim 1, wherein the driven gear is in an upper part of the axle above the electricity distributor.

7. Fully rotating rotary actuator according to claim 1, wherein the inner ring of the electricity distributor is fastened to the frame while its outer ring is fastened to the axle.

8. Fully rotating rotary actuator according to claim 1, wherein the additional conduit provides the additive fluid line, wherein the fully rotatable connector of the additional fluid line is below the electricity distributor, and wherein the tube guided to said fully rotatable connector is guided through the electricity distributor.

9. Fully rotating rotary actuator according to claim 1, wherein the tube is provided in the additional conduit and the tube is adapted for the additive fluid, wherein the additive fluid is of dangerous nature to hydraulics of the fully rotating actuator and wherein the tube is a hydraulic tube.

10. Fully rotating rotary actuator according to claim 9, wherein the additive fluid comprises urea.

11. Fully rotating rotary actuator according to claim 1, wherein the second part (B) extends outward from and is rotatable relative to the first part (A).

* * * * *